Patented Apr. 26, 1949

2,468,593

UNITED STATES PATENT OFFICE 2,468,593

TRIHALOALKYLIDENEAMINES AND A METHOD FOR THEIR PREPARATION

Stephen C. Dorman, Modesto, Calif., assignor to Shell Development Company, San Francisco, Calif., a corporation of Delaware No Drawing. Application July 5, 1947, Serial No. 759,311

6 Claims. (Cl. 260—566)

This invention relates to trihaloalkylideneamines and to a method for their production. More particularly the invention relates to N-substituted imines which contain a trichloromethyl radical, and in its most specific embodiment, the invention provides novel trichlorethylideneamines and a method for their production.

Organic imines, i. e., alkylideneamines, have been found to be useful for a variety of purposes including their employment as ingredients of insecticidal composition, as compounding agents in the manufacture of rubber, and as intermediates in synthesis of other organic compounds, particularly secondary amines.

Among the several objects of the present invention may be noted the provision of a trihaloalkylidene amine having the general formula,

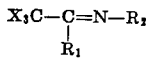

wherein X represents a halogen atom, $R_1$ preferably represents the hydrogen atom, but may be an alkanyl radical of not more than about four carbon atoms, and $R_2$ preferably represents a hydrocarbon radical of essentially aliphatic character joined to the nitrogen atom by a carbon atom which is directly attached to at least two other carbon atoms, but may represent any aliphatic, alicyclic aliphatic-aromatic or aromatic hydrocarbon radical, or a heterocyclic radical. Other objects and advantages of the present invention will be clear from the following description.

The trihaloalkylideneamines have a greatly enhanced value for most applications due to the presence of the trihalomethyl radical. For example, in the case of their employment as insecticides, the killing power of the imine is multiplied by the presence of the trihalomethyl radical which greatly increases the lipoid solubility of the compound. In the case of their employment as rubber compounding agents, the presence of polyhalogenated atoms has been found to markedly increase the value and utility of the compounding agent. In the case of their employment as intermediates in the synthesis of organic compounds, the compounds of the present invention provide a source of numerous N-trihaloalkyl compounds since they may be converted into secondary amines by treatments such as reduction, reaction with alkyl iodides or Grignard reagents, or may be converted into cyclic compounds such as the diketopyrrolidines by causing them to react with acetylpyruvic acid.

It would not be expected that trihaloalkylideneamines could be prepared by a direct condensation reaction. Chloral is one of the best known alpha-trihalo carbonyl compounds and its chemical properties are representative. Chloral differs from most carbonyl compounds by adding to compounds containing a reactive hydrogen atom to form stable substances such as, chloral hydrate,

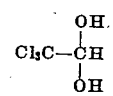

and chloralammonia,

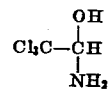

and would not be expected to form imines, particularly by its reaction with aliphatic amines which are the amines most closely resembling ammonia in chemical properties. It has now been surprisingly discovered, however, that under certain reaction conditions alpha-trihalo aliphatic carbonyl compounds can be caused to add directly to a primary amine, not to form the expected alkyl derivative of an aldehyde ammonia, but to form the novel imines of the present invention.

Illustrative examples of the halogen atoms which may suitably be represented by the X of the general formula above include, fluorine, chlorine, bromine, and iodine, of which chlorine and to a certain extent bromine have been found to be particularly suitable for the majority of applications and are preferred.

Examples of the alkanyl radicals which may suitably be represented by $R_1$ of the general formula include, methyl, ethyl, propyl, butyl, isopropyl, secondary-butyl, tertiary-butyl, and the like radicals which may, for certain applications, be halo- or hydroxy-substituted. In general, however, it is preferable that $R_1$ represent the hydrogen atom, in which case the compounds are aldimines, such as a N-alkyl chloralimine or bromalimine.

$R_2$ of the general formula preferably represents a hydrocarbon radical of essentially aliphatic character joined to the nitrogen atom by a carbon atom which is directly attached to at least two other carbon atoms. Illustrative of these preferred radicals are, cyclohexyl, cyclopentyl, cyclopentadienyl, the methyl, ethyl, propyl, or butylcyclohexyl radicals, cyclohexadienyl, and the like radicals, of which the polyalkylated saturated hydrocarbon radicals are particularly preferred. Illustrative of the aliphatic, aliphatic-aromatic, or aromatic hydrocarbon, or heterocyclic radicals which $R_2$ may suitably represent are, pentyl, pentenyl, phenyl, tertiary-butyl, butenyl, naphthyl, methyl, allyl, tolyl, propyl, butadienyl isopropyl, hexyl, octyl, pentadienyl, iso-octyl, normaldecyl, tetradecyl, hexadienyl, cetyl, propargyl, geranyl, oleyl, allylhexyl, pentynyl, propynyl, and the like. The heterocyclic radicals which may suitably be represented by $R_2$ of the general formula preferably contain not more than about five carbon atoms in the ring and include radicals such as, pyridyl, sulfonanyl, pyrrolyl, thioenyl, furyl, butylcarbothionyl, octylcarbothionyl, and the like heterocyclic radicals containing in the ring atoms or groups such as:

$$-S-, \quad -\overset{O}{\underset{O}{S}}-, \quad -\overset{O}{S}-, \quad -\overset{O}{C}-, \quad -O-, \quad -\overset{\|}{N}-$$

Illustrative examples of the trihaloalkylideneamines of the present invention include the following particular compounds, which, for the sake of brevity, in the majority of cases, will be named as amines containing as N-linked substituents, chloroethylidene $Cl_3CCH=$, bromoethylidene $Br_3CCH=$, and the like radicals:

Chloroethylidenebutylamine
Bromoethylidenecyclopentylamine
Chloroethylideneallylamine
Bromoethylidenebutadieneylamine 2,2,2-trichloro-1-methylethylidenebutadieneylamine
Chloroethylideneisopropylamine 2,2,2-tribromo-1-methylethylideneisopropylamine
Chloroethylidenefuranylamine 2,2,2-trichloro-1-ethylethylidenefuranylamine
Chloroethylidene thianylamine 2,2,2-trichloro-1-ethylethylidenethianylamine
Bromoethylideneisophoronylamine 2,2,2-trichloro-1-ethylethylideneisophoronylamine
Bromoethylidenechloropentylamine 2,2,2-trichloro-1-ethylethylidenechloropentylamine
Bromoethylidenecyclohexylamine
Chloroethylideneethylallylamine
Chloroethylidenepentadienylamine
Chloroethylidenetertiary-butylamine
Chloroethylidenebromopropylamine
Chloroethylidenechlorocyclobutylamine
Chloroethylidenepropenylamine
Bromoethylidenehexadienylamine
Bromoethylideneisopentylamine
Bromoethylidenebutylcarbothionylamine
Bromoethylidenefurylamine
Bromoethylidenepyrrolylamine
Bromoethylidenepyridylamine The particularly preferred subclass of the trihaloalkylideneamines which have been found to exhibit the most outstandingly novel and valuable properties, especially as insecticidal agents, have the general formula,

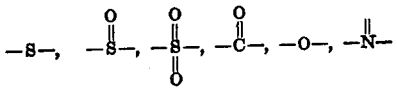

wherein X represents a chlorine atom $R_1$ represents the hydrogen atom, and $R_2$ represents a hydrocarbon radical of essentially aliphatic character joined to the nitrogen atom by a carbon atom which is directly attached to at least two other carbon atoms. Representative examples of this particularly preferred subclass include, Trichloroethylidene - 3,3,5 - trimethylcyclohexylamine
Trichloroethylidene-1,3-dimethylbutylamine
Trichloroethylidenemethylisopropylcarbinylamine
Trichloroethylidenecyclohexylamine
Trichloroethylidenemethylcyclopentylamine
Trichloroethylidenemethylcyclobutylamine
Trichloroethylidene-tertiary-butylamine
Trichloroethylidene isopropylclohexylamine
Trichloroethylidene-secondary-butylamine
Trichloroethylidene-1-methyl-propinyl-2-amine
Trichloroethylidene dimethylcyclobutylamine The preparation of the trihaloalkylideneamines may in general be accomplished by contacting any primary amine containing a hydrocarbon radical with an aldehyde of ketone containing a trihalogenated carbon atom adjacent to the carbonyl group under mildly dehydrating reaction conditions.

"Mildly dehydrating reaction conditions" may suitably comprise any reaction conditions which will favor or promote the substantial elimination of water from intimate contact with the uncombined reactants without the employment of high temperatures or powerful dehydrating catalysts. In many cases this may be accomplished by carrying out the reaction in a dehydrating still at about the boiling temperature of the reactants. For example, when the reactants and their condensation product have boiling points above that of water, by maintaining a heavy reflux in the reactor it is possible to continuously withdraw the water from the reaction mixture as it is formed. When the reactants vaporize at a temperature above the vaporization temperature of water, but their condensation product vaporizes below the vaporization temperature of water, the reaction may be similarly conducted with the continuous removal of condensation product in conjunction with water, and a subsequently separation. When the reactants vaporize at temperatures lower than the vaporization temperature of water, the reaction is best conducted in the presence of a considerable portion of an inert solvent which is immiscible with water, and is often facilitated by the presence of a small amount of a catalyst such as zinc chloride.

Suitable solvents for employment as the reaction medium for the condensation reaction comprises any aromatic and aliphatic hydrocarbon having a boiling point high enough to form a reaction medium which will reflux at the desired temperature and which are immiscible with water at this temperature. In certain cases such solvents will form low-boiling azeotropic mixtures with water, in many cases, boiling lower than the particular reactants employed thereby allowing the continuous removal of water by continuously distilling off the water-solvent azeotrope and adding solvent as required to maintain the desired solvent concentration in the reaction medium. The amount of solvent employed may suitably be varied over extreme limits, the amount of variation which is suitable in each given case depending upon factors such as the ease of separating the solvent employed from the imine to be produced, the water miscibility of the reactants at the reaction temperature, the decrease in the rate of reaction caused by the inert diluent and the like.

The preparation of the trihaloalkylideneamines may be conducted in a batch, intermittent or continuous manner. When it is desired to execute the process in a continuous manner, a suitable reaction stage or stages in communication with one or a plurality of separation and purification stages may be provided. The volume of the reaction mixture and the relative concentrations of the reactants in the reaction stage or stages may be kept substantially constant by the intermittent or continuous introduction therein of the reactants at about the same rate at which they are reacted and the products removed from the reaction mixture. The reactants separated from the condensed distillate may be reutilized by introducing them into a reaction stage as a mixture independently or in conjunction with the main reactant feed or feeds.

As an alternative mode of operation, the condensation may be effected in a reaction column into which the reactants may be introduced at one or a plurality of zones, the location of which zones is dependent upon the relative boiling temperatures of the particular reactants, products, and constant boiling mixtures which may be formed.

Trihaloalkylideneamines may be prepared by reacting a single primary amine with a single carbonyl compound, thus forming a single trihaloalkylideneamine as a product, however, if it is desired to prepare a mixture of trihaloalkylideneamines, a mixture of carbonyl compounds may be caused to react with one or more primary amines. The resulting mixture of trihaloalkylideneamines may be used without separation, or if desired, may be separated by any suitable means, as by fractional distillation, for example, when there is a sufficiently great difference in the vaporization temperatures of the trihaloalkylideneamines.

The presence of a catalyst in the preparation reaction is not essential, especially when the carbonyl compound employed is an aldehyde, but a more rapid and a smoother conversion may often be obtained by the employment of a small amount of an acidic catalyst such as an inorganic or sulfonic acid or an acid salt such as zinc chloride or aluminum chloride.

The condensation or dehydration reaction is generally conducted at the reflux temperature of the reaction medium under atmospheric pressure, but superatmospheric pressure may be used whenever expedient to accelerate the reaction by increasing the temperature of the refluxing. Similarly, subatmospheric pressures may be employed to obtain the refluxing of a reaction medium which at atmospheric pressure would boil at temperatures causing appreciable decomposition. In general, by conducting the reaction under a continual reflux at temperatures between about 40° C. and the decomposition temperature, a sufficiently intimate contact is maintained between the reactants, and/or the reactants and catalyst, where a catalyst is employed, without the employment of stirring, shaking, and the like means of maintaining such contact.

The employment of substantially equimolar portions of the carbonyl compound and the primary amine is generally productive of good yields of the desired imine. However, the reaction is essentially one of equilibrium and the equilibrium may be shifted so that the production of the desired imine is favored by the use of an excess of one of the reactants. Such a procedure is most often advantageous when the physical characteristics of one of the reactants allows its easy separation from the reaction medium and/or reaction products.

Suitable carbonyl compounds for the preparation of the trihaloalkylideneamines of the present invention comprise any of the 2,2,2-trihalo carbonyl compounds which are stable at their boiling temperatures under the pressures at which it is desirable or practical to conduct the condensation reaction. Carbonyl compounds such as chloral, bromal, trichloroacetone, and the like, are suitable and chloral is the most particularly preferred carbonyl compound for employment in the present process whether employed per se or in the form of its solid hydrate, i. e., as chloralhydrate.

A wide variety of primary aliphatic amines may be employed to form the imines of the present invention including those containing essentially non-ionic functional groups, as halogen atoms for example, attached to the aliphatic radical of the amines. Specific examples of amines which may be used in the synthesis of the present compounds include, ethylamine, propylamine, butylamine, isopropylamine, secondary-butylamine, isobutylamine, allylamine, methallylamine, ethylenediamine, propylenediamine, butylenediamine, cyclopentylamine, cyclohexylamine, isophorylamine, dihydroisophorylamine, methylisobutylcarbinylamine, and the like.

By way of illustrating the preferred method of preparing the trihaloalkylideneamines of the present invention, the preparation of, Trichloroethylidene - 3,3,5 - trimethylcyclohexylamine
Trichloroethylidene-1,3-dimethylbutylamine
Trichloroethylidenemethylisobutylcarbinylamine are described below.

In the preparation of trichloroethylidene-3,3,5-trimethylcyclohexylamine, a reaction mixture comprising 100 parts by weight of benzene, 147 parts by weight of chloral, 141 parts by weight of 3,3,5-trimethylcyclohexylamine (equimolar portions) and about 2.5 parts by weight of zinc chloride was refluxed for about one hour under atmospheric pressure. The reaction mixture was then washed with 20 parts by weight of 50% aqueous solution of sodium carbonate and subjected to a fractional distillation under reduced pressure. A liquid fraction boiling between 80° C. and 90° C. at 0.8 mm. was obtained in the amount of 93.4 parts by weight, which upon redistillation yielded a colorless liquid boiling at 80–93° C. under pressure of 0.1 mm. A chemical analysis indicated the product to be of the formula,

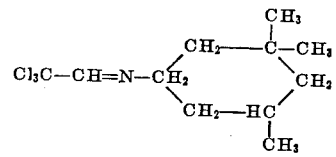

Per cent nitrogen, found 15.1 (6), calculated 5.18, $n_D^{20}$ 1.4880, $d_4^{20}$ 1.1196; per cent chlorine, found 37.7, calculated 39.3.

trichloroethylidene-1,3-dimethylbutylamine and trichloroethylidenemethyl-isobutylcarbinylamine are similar prepared by the employment of 1,3-dimethylbutylamine and methylisobutylcarbinylamine respectively. The solutions containing the respective amines and substantially equimolar quantities of chloral are refluxed under atmospheric pressure for about one hour. The employment of the zinc chloride may be omitted without appreciably affecting the yield of the desired product and in this way the step of washing the reaction medium with aqueous sodium carbonate before distillation may be avoided.

It will be seen from the above description that the trihaloalkylideneamines are readily available compounds when prepared in accordance with the process of the present invention. By virtue of the presence of a trihalomethyl radical and the highly reactive imine group these substances form valuable intermediates in the synthesis of other organic compounds and are in many cases useful compounding agents for rubber. Their particularly valuable use, that of insecticides and components of insecticidal compositions is described and claimed in my copending application Serial No. 549,487, filed August 14, 1944, now U. S. Patent No. 2,468,592 of which the present application is a continuation-in-part.

The invention claimed is:

1. N - 2,2,2 - trichloroethylidene - 3,3,5 - trimethylcyclohexylamine.

2. A method of preparing N-2,2,2-trichloroethylidene-3,3,5-trimethycyclohexylamine which comprises refluxing substantially equimolar portions of chloral and 3,3,5-trimethylcyclohexylamine dissolved in benzene in the presence of a small amount of zinc chloride.

3. An amine of the formula $CCl_3CH=N-R$ where R is a cycloalkyl radical.

4. A method of preparing an amine of the formula $CCl_3CH=N-R$ where R is a cycloalkyl radical which comprises, refluxing substantially equimolar portions of chloral and a cycloalkylamine dissolved in a liquid aromatic hydrocarbon in the presence of a small amount of an acidic condensation catalyst.

5. An amine of the formula $CCl_3CH=N-R$ where R is an alicyclic hydrocarbon radical.

6. A process for the production of an amine of the formula $CCl_3CH=N-R$ where R is an alicyclic hydrocarbon radical which comprises, refluxing chloral and an alicyclic hydrocarbon amine dissolved in a water-immiscible liquid hydrocarbon.

STEPHEN C. DORMAN.

REFERENCES CITED

The following references are of record in the file of this patent:

UNITED STATES PATENTS

| Number | Name | Date |
| --- | --- | --- |
| 2,329,074 | Muller | Sept. 7, 1943 |

FOREIGN PATENTS

| Number | Country | Date |
| --- | --- | --- |
| 112,216 | Germany | June 25, 1900 |

OTHER REFERENCES

Paal et al.: "Ber. deut. Chem.," vol. 25 (1892), page 2970.

Wheeler et al.: "Jour. Am. Chem. Soc.," vol. 30 (1908), pp. 136–142; vol. 31 (1909), pp. 937–943.

Bergmann et al.: "Ber. deut. Chem.," vol. 58 (1925), page 1042.

Sumerford et al.: "J. Org. Chem.," vol. 9 (1944), pages 81–94.